Oct. 8, 1940.  W. F. ALLER  2,216,795
MEASURING INSTRUMENT
Filed May 2, 1938  3 Sheets-Sheet 1

INVENTOR
Willis Fay Aller
BY
Maréchal + Nos
ATTORNEY

Oct. 8, 1940.     W. F. ALLER     2,216,795
MEASURING INSTRUMENT
Filed May 2, 1938     3 Sheets-Sheet 2
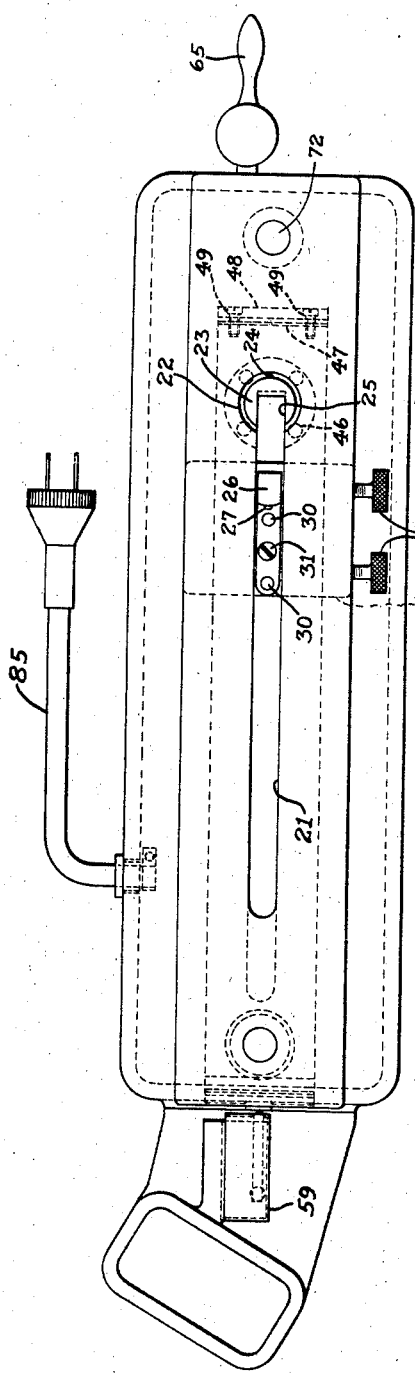
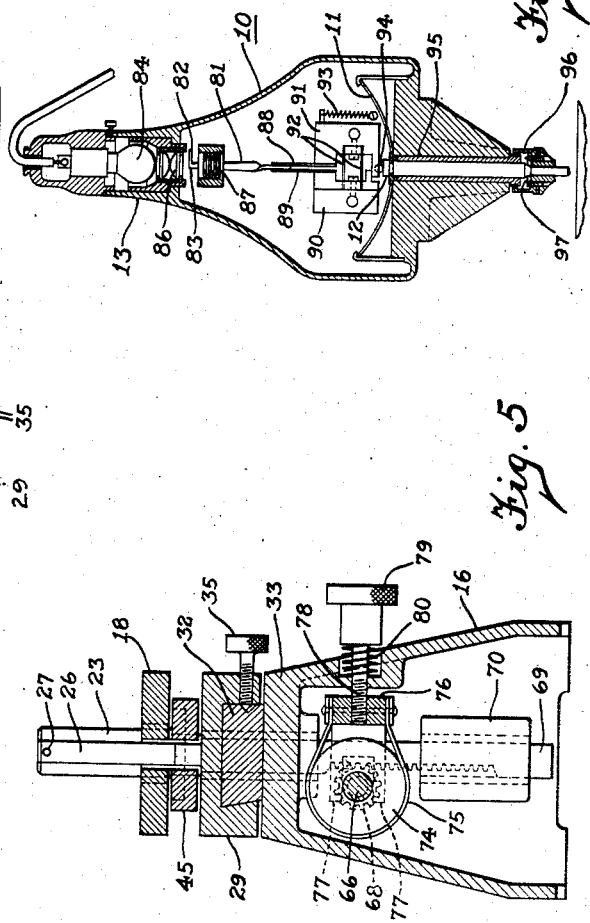
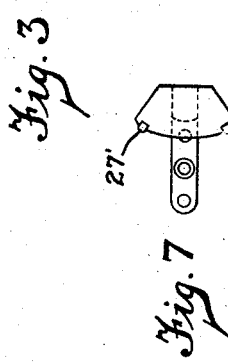
INVENTOR
Willis Fay Aller
BY
Maréchal & Noë
ATTORNEY

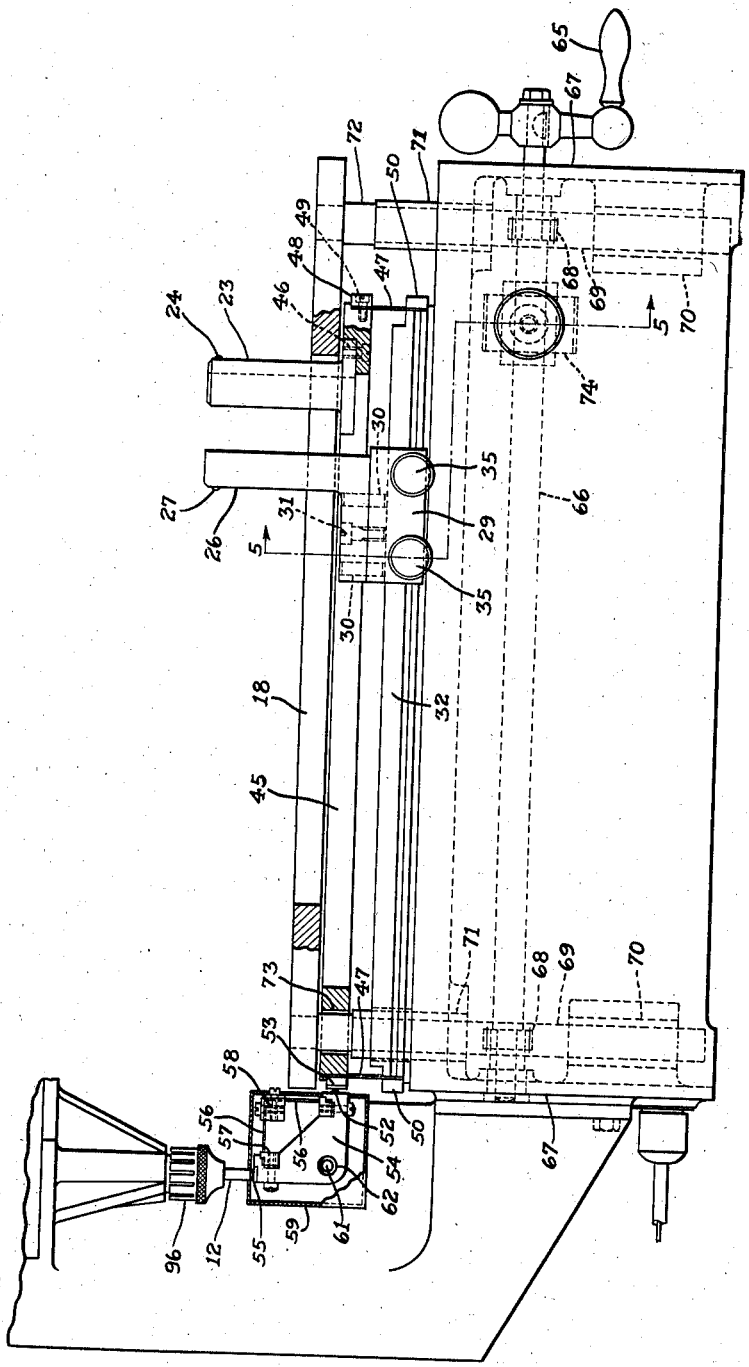

Patented Oct. 8, 1940

2,216,795

UNITED STATES PATENT OFFICE 2,216,795

MEASURING INSTRUMENT

Willis Fay Aller, Dayton, Ohio, assignor to The Sheffield Gage Corporation, Dayton, Ohio, a corporation of Ohio Application May 2, 1938, Serial No. 205,488

7 Claims. (Cl. 33—147)

This invention relates to measuring or gaging apparatus.

One object of the invention is the provision of a gage having a plurality of relatively adjustable gaging elements adapted for a wide range of adjustment and cooperatively associated with an indicating device to gage or compare internal diameters or the like on work pieces.

Another object of the invention is the provision of a gage having a substantially horizontal work supporting table on which the work pieces are supported during the gaging operation, and a plurality of relatively adjustable gaging elements projecting from the table to engage the work and cooperating with an indicating device adapted to show the size of the gaged part as compared with a standard part.

Another object of the invention is the provision of a gage having a work supporting table and a plurality of gaging elements projecting transversely of the table and adapted for cooperation with a work piece, the table being relatively movable with respect to the gaging elements so that different portions along the length of a surface or bore in the work piece may be checked.

Another object of the invention is the provision of a gage having a plurality of gaging elements one of which is adjustably carried by the gage support so that it may be positioned at a predetermined spacing with respect to the other, which is supported for movement during the gaging operation and connected to a gaging device on which the dimension or out-of-size measurement of the work piece is shown.

Another object of the invention is the provision of a gage having a substantially horizontal supporting portion and an indicating device provided with an upstanding part of the support at one end of a work supporting table on which the work is carried.

Other objects and advantages of the invention will be apparent from the following description, the appended claims and accompanying drawings, in which—

Fig. 3 is a top plan view of the gage;

Fig. 4 is a side elevation of the lower part of the gage, shown partly in vertical section;

Fig. 5 is a vertical section on the line 5—5 of Fig. 4;

Fig. 6 is a front view, partly in section, showing the indicating mechanism of the indicating device; and Figs. 7 and 8 are detail views of a modified form of gage post.

Figures 1, 2:
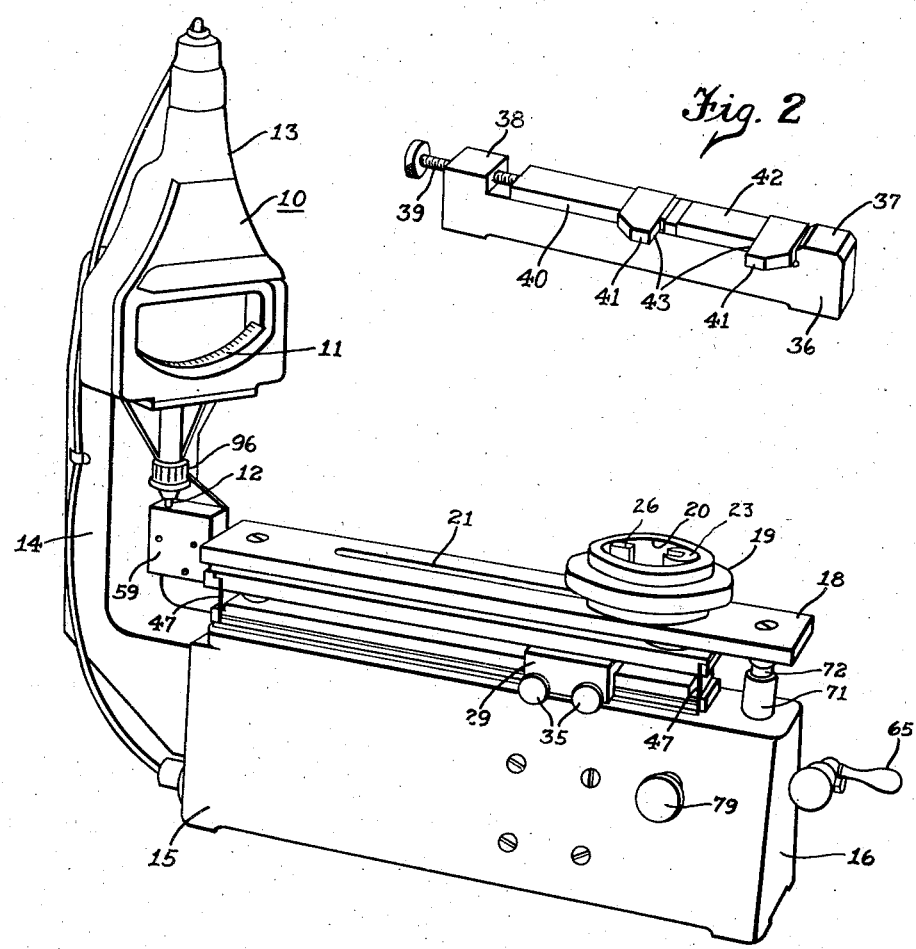
Fig. 1 is a perspective view of a gage embodying the present invention.
Fig. 2 is a perspective view of a setting block by means of which any initial spacing of the gaging elements of the device may be determined.

Referring more particularly to the drawings by reference numerals, 10 generally designates an indicating device having a suitable scale 11 and an operating plunger 12 which determines the reading on the scale 11. The housing 13 of the indicating device is carried on an upwardly extending portion 14 of a support 15 which includes a horizontally extending base portion 16. Suitably supported above the base portion 16 is a work supporting table 18 which, as shown, projects horizontally so as to carry the work pieces being gaged. Such a work piece is shown at 19 having an internal passage 20 the size of which is to be gaged or measured.

The table 18 is provided with a longitudinally extending vertical slot 21 which is enlarged at one end to provide a part cylindrical hole 22. Projecting upwardly through the hole 22 and slot 21 in the table are two relatively adjustable gaging elements one of which is supported for movement during a gaging operation and operably connected to the indicating mechanism of the device 10. As shown, the gaging element 23 is a post of sufficient length so that the hardened gaging point 24, which is carried near the upper end of the post, can project up far enough above the table so that surfaces of considerable length in the work pieces can be checked or gaged at different points along the axis of the opening. The gaging element 23 is preferably provided with a longitudinally extending depression or groove 25 which may receive a part of the second gaging element 26 which is slightly narrower than the width of the slot 21 so that it may be moved to different positions along the length of the slot remote from gaging element 23 in gaging openings of large size, or can be partly housed within the gaging element 23 for checking holes of small size. The gaging element 26 also has fixed thereon a hard gaging point 27 which contacts with the work in a gaging operation. Where the gage is to be used for comparing external sizes or dimensions the gaging points are arranged on the adjacent sides of the gaging elements, but as illustrated the gage is shown for checking holes or bores in work pieces and the gaging points are provided on the outer sides of the gaging elements.

The lower end of the gaging element 26 is fixed to and supported by a saddle 29 so that it may be readily removed, suitable locating pins 30 and a connecting screw 31 holding the foot portion of the gaging element 26 securely on the saddle 29. The saddle is of substantially inverted U form and fits slidably upon a horizontally grooved supporting block 32 which is fixed on the upper wall 33 of the base portion 16. One side of the saddle carries a pair of adjustable set screws 35 which may be readily tightened by hand to engage the groove in the block 32 and thus fix the saddle 29 at any desired portion along the length of the block 32. Thus if a ring having an internal diameter of 3″ for example is to be checked or compared with a standard 3″ opening of a standard part, the distance between the outer surfaces of the gaging points 24 and 27 is set so as to have a spacing of 3″ by adjusting the saddle 29 and then locking the gaging element 26 in fixed position by tightening the screws 35. This initial setting of the gaging element 26 is preferably accomplished by means of a setting block shown in Fig. 2 and comprising a block 36 having upstanding end projections 37, 38. A pressure screw 39 is threaded in the projection 38 so as to bear against a pressure block 40 which clamps a pair of outwardly projecting locating arms 41 and one or more dimension blocks 42 of the predetermined desired size against the projection 37 so as to hold these several parts in fixed relation, with the inner sides 43 of the arms 41 spaced exactly the required distance apart. The block 36 is placed on the table 18 so that the inner side of one of the arms 41 contacts the gaging point 24 and the gaging element 26 is then adjusted longitudinally along the table until its gaging point 27 touches the side 43 of the other arm 41. The indicating device may then be set by adjusting the plunger 12 so as to give a zero reading and the setting block is then removed from the table.

The gaging element 23 is fixed on a carrying member or bar 45 as by means of screws 46 attached to a bottom flange portion of the gaging element. The bar 45 is supported for movement in the direction of its length, preferably by means of a plurality of supporting flexible spring blades 47 arranged at opposite ends of the bar with the upper ends of the blades 47 secured rigidly to the ends of the bar by means of clamp blocks 48 and attaching screws 49. The lower ends of the spring blades 47 are similarly fastened by means of clamp blocks 50 to the ends of the stationary block 32 so that the blades normally stand upright and parallel to one another, but afford horizontal parallel movement of the bar 45 while eliminating all play and lost motion in its means of support.

One end of bar 45 is provided with a flat hard surface 52 which engages a point 53 on a motion transmitting block 54. On the block 54 is a flat hard surface 55 engaging the operating plunger 12 of the indicating device. The block 54, as shown, is carried by a pair of flat straight flexible metal blades 56 which project preferably at 90° to one another. One end of each of the metal blades 56 is connected by means of a suitable clamp block 57 so that it is securely fastened to the block 54, while the other end of each blade 56 is secured in fixed position on a stationary projection 58 forming a part of the support plate 59 which is fastened to the upwardly extending portion 14 of the gage support. The stationary supporting plate 59 is preferably provided with a stud 61 projecting through an opening 62 in the block 54, slightly larger than the diameter of the stud 61, so as to limit rotational movements of the block 54. It will now be apparent that the block 54 is mounted for small angular motion about an axis substantially corresponding to the point of intersection of the blades 56, and serves to transmit horizontal movements of the bar 45 into vertical movements of the plunger 12 while accurately reproducing the same degree of motion in the plunger 12 in accordance with the horizontal components of the movement of bar 45.

The indicating device incorporates suitable spring means or the like for maintaining the plunger 12 yieldingly engaged with the flat surface 55 on the motion transmitting block 54, and holds the point 53 against the surface 52 in a yielding manner and under slight initial pressure so that in the normal position of the parts, before a work piece is applied to the gaging elements, the spring pressure acting downwardly on the plunger 12 holds the blades 56 and the spring 47 in very slight tension, holding the gaging points 24 and 27 of the gaging elements with a spacing a few thousandths of an inch in excess of the size of the standard hole with which the internal opening of the work piece is to be compared. In this normal position the indicating part of the indicating device may show some positive reading so that when the work piece is applied and the gaging element 23 is moved slightly toward element 26 the gaging point 24 rides upon the surface of the opening in the part, the spring blades 47 can then be moved to a vertical position, the spring blades 56 straightened, and the operating plunger 12 moved slightly upwardly so as to give a zero reading on the scale if the size of the hole in the work piece is of the required dimension for which the device was set initially. Any departure from the desired dimension may be shown on the scale 11.

The work table 18, as herein shown, is adapted for vertical movement so that the work piece may be carried upwardly or downwardly along the gaging elements and definite points along the length of the opening in the work piece may thus be checked. As the table is moved vertically any variation in the size of the opening in the work piece will be apparent on the scale 11. The table is moved vertically by means of an operating handle 65, carried by rotatable shaft 66 which is journalled for rotation in the end walls 67 of base 16. Fixed to the shaft 66 are a plurality of operating pinions 68 which mesh with racks 69 that are slidably supported in vertical bearing blocks 70 and in bearing portions 71 provided in the upper wall 33 of the base. The upper portions of the racks 69 are secured to posts 72, of circular cross section, secured at their upper ends to the table 18. One of the posts 72 extends through a hole 73 in the bar 45 so that there is normally some small clearance between the sides of the post 72 and the hole 73 although excessive movements of the bar 45 are limited thereby so as to prevent undue flexing or strain on the spring blades 56 and 47.

The table 18 is adapted to remain in any position to which it is adjusted and is suitably held in such position in a yielding manner, preferably by means of a friction band 75 which frictionally engages a brake drum 74 fixed on the shaft 66. The brake band is preferably secured at its opposite ends to an adjustably movable block 76 which is slidably guided by the shaft 66 so that it can move towards and away from the axis of the shaft 66. As shown in Fig. 5, the block 76 is provided with a pair of upper and lower arms 77 which straddle the shaft 66 but permit the block to be moved towards or from the side of the base member 16. The block 76 is engaged by a screw 78 that may be turned by a manually adjustable knob 79 so as to increase or decrease the tension of a spring 80 that acts to yieldingly hold the block 76 toward the right as shown in Fig. 5. Operating the knob 79 thus adjusts the braking force, which is preferably maintained at such value as to hold the table 18 from descending except when the table is pushed downwardly directly by the operator or is so operated as to move downwardly by turning the crank 65. However, it is unnecessary for the operator to turn the crank 65 in order to lower the table, as he may control the descent of the table merely by pressing downwardly on the top of the table while observing the readings on the indicating device. Since the indicating device is arranged in an upwardly extending portion of the support and at one side of the work itself, the readings on the scale are very readily apparent and conveniently positioned.

The indicating device 10 may be of any suitable character but as shown in Fig. 6 it comprises a movable bar 81 having a forwardly projecting target 82 adapted to move across the path of a light beam so as to cast the shadow of the straight edge portion 83 on the scale 11. The light is produced by a lamp 84 energized through the connection 85, suitable rectifying lenses 86 and 87 being interposed between the lamp 84 and the scale and preferably on opposite sides of the target 82. The arm 81 is attached at its lower end to two flexible spring blades 88 and 89 which are connected respectively to fixed and movable blocks 90 and 91. The block 91 is supported for vertical movement by means of a pair of parallel horizontal spring blades 92, and is urged downwardly by its own weight and by a spring 93 so that its hard point 94 is maintained in engagement with the upper end of the plunger 12 at a point spaced from the axis of the plunger. The plunger 12 is rotatably supported in a fixed sleeve 95, and its upper end is slightly inclined so that rotation of the plunger about its own axis provides an adjustment of the reading on the scale. The lower end of the plunger projects through a rotatably adjustable sleeve 96 which is resiliently held on the lower portion of the fixed sleeve 95 and which carries a supporting spring plate 97 having a rectangular hole through which the lower portion of the plunger 12 extends, in interfitting relationship. The supporting spring plate 97 is held so that it must rotate with the manually adjustable sleeve 96, and when the latter is turned to provide adjustment of the setting of the scale indication, the rectangular opening in the plate 97 engaging the correspondingly shaped portion of the plunger 12 causes rotational movements of the plunger, raising or lowering the point 94 because of the inclined surface on the upper end of the plunger.

The use of gaging elements 23 and 26 of the form shown in Figs. 1 to 6 permits the measurement across the diameter of an opening, the work piece being moved by the operator during the checking operation to insure a measurement in a diametrical direction. However, where greater rapidity of checking is desired, one or the other of the gaging elements 23 or 26 may be provided with a plurality of gaging strips or gaging points so that the hole in the work piece may be contacted simultaneously at three different triangularly related points. The gage element 26, for example, may be removed from the saddle 29 and replaced by another gage element 26' having suitable passages 30' for the locating pins and the passage 31' for the attaching screw 31. The upper end of this gaging element 26' is provided with an enlarged head portion in which are two laterally spaced gaging strips 27' adapted for contact with the passage in the work and cooperating with the gaging point on the other gaging element 23 so that the operator is not required to shift the work piece laterally on the work supporting table in effecting the gaging operation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gage comprising a support, an indicating device on said support, a substantially horizontal work supporting table carried by said support, a plurality of gaging elements arranged above said table and projecting upwardly substantially at 90° to said table, means for relatively adjusting said gaging elements to afford predetermined spacing thereof, means operably connected to said indicating device and movably supporting one of said gaging elements, and means for relatively moving said table substantially vertically with respect to said gaging elements.

2. A gage comprising a support, an indicating device on said support, a first gaging post adjustably mounted on said support, a cooperating gaging post, carrying means on which said second gaging post is fixed, means mounting said carrying means on said support for movement of the second gaging post towards and away from the first gaging post in a gaging operation, means operably connecting said carrying means to said indicating device, and a work engaging means adjustably mounted on said support for movement in the direction of length of said gaging posts.

3. A gage comprising a support, an indicating device on said support, a substantially horizontal work supporting table carried by said support, a first gaging element projecting upwardly at substantially 90° to said table, a second gaging element projecting upwardly at substantially 90° to said table, a longitudinally movable bar operatively connected to said indicating device and fixed to said second gaging element, a plurality of parallel flexible spring blades supporting said bar for parallel longitudinal movement on said support for variation of the spacing between said gaging elements, and means for raising and lowering the table with respect to said gaging elements.

4. A gage comprising a support, an indicating device on said support, a substantially horizontal work supporting table, manually operable means for raising and lowering said table on said support, means yieldingly resisting downward movement of said table and normally acting to yieldingly hold the table in a predetermined position on the support, a plurality of relatively movable gaging elements projecting upwardly from said table, means for locating one of said gaging elements on said support, and means operably connected to said indicating device for carrying the other gaging element.

5. A gage comprising a support, an indicating device on said support, a substantially horizontal work supporting table, manually operable rack and gear means for raising and lowering said table on said support, a friction brake resisting downward movement of said table and normally acting to yieldingly hold the table in a predetermined position on the support, a plurality of relatively movable gaging elements projecting upwardly from said table, means mounting one of said gaging elements to said support, and means operably connected to said indicating device for carrying the other gaging element.

6. A gage comprising a support including a horizontally extending base portion and an upwardly extending end portion projecting upwardly from one end of the base portion, an indicating device in said upwardly extending portion, a substantially horizontal work supporting table arranged above the horizontally extending portion of the support, means adjustably supporting said table for substantially vertical movements on said support, a gaging element projecting from said table and carried by said support, a second gaging element projecting from said table, and carrying means operably connected to said indicating device and supporting said second gaging element for substantially horizontal movement towards and from said first gaging element.

7. A gaging instrument comprising a pair of gaging posts adapted for simultaneous engagement with a workpiece, a support, a carrying bar for one of said posts, a pair of parallel spring blades attached to said bar and said support and yieldingly mounting said bar for reciprocatory movement of said one gaging post towards and away from the other gaging post, indicating means carried by said support, an operating plunger for said indicating means, a motion-transmitting part interposed between said plunger and one end of said bar for moving said plunger in accordance with the relative movement of said posts, a pair of spring blades extending substantially at right angles to one another and supporting said part for movement about an axis, and a substantially horizontal work-carrying table on said support through which said gaging posts project.

WILLIS FAY ALLER.